United States Patent [19]

Hill

[11] 3,972,576
[45] Aug. 3, 1976

[54] FLANGED HALF BEARINGS

[75] Inventor: Joseph Henry Hill, Greenford, England

[73] Assignee: Vandervell Products Limited, Berkshire, England

[22] Filed: Feb. 27, 1975

[21] Appl. No.: 553,662

[52] U.S. Cl. .............................................. 308/237 R
[51] Int. Cl.² ...................................... F16C 33/14
[58] Field of Search .............. 308/237 R, 23, 23.5, 308/161, 165, 167; 29/149.5, 513

[56] References Cited
UNITED STATES PATENTS

| | | | |
|---|---|---|---|
| 3,375,563 | 4/1968 | Kingsbury et al. | 308/237 X |
| 3,713,714 | 1/1973 | Hill et al. | 308/237 |

*Primary Examiner*—Kenneth H. Betts
*Assistant Examiner*—Gene A. Church
*Attorney, Agent, or Firm*—Edward F. Connors

[57] ABSTRACT

A flanged half bearing has flanges connected to a bearing liner by lugs on the flanges which engage in slots in the liner edges to permit the liner to flex radially. The liner edges have abutments to hold the flanges on the liner and the inner circumferential edges of the flanged ends of the bearing are curved in profile as viewed in cross-section through the bearing axis.

4 Claims, 3 Drawing Figures

FLANGED HALF BEARINGS

BACKGROUND OF THE INVENTION

1. Field of the Invention

This invention relates to flanged half bearings.

2. Description of the Prior Art

In U.S. Pat. No. 3,713,714 there is described and claimed a flanged half bearing comprising a thin wall flexible half bearing liner and a flange extending radially outwardly of at least one axial end of the liner, the flange being attached to the liner by means which allow the circumferential shape of the liner to vary relative to the flange. The inner edges of the liner and flange are chamfered to provide a chamfer around the inner periphery of the assembled bearing which can accommodate a radiused corner or fillet radius between the cheek and journal of a crankshaft supported by the bearing.

SUMMARY OF THE INVENTION

This invention provides a flanged half bearing comprising a thin wall flexible half bearing liner and a flange or flanges extending radially outwardly of one or both ends of the liner and attached to the liner by means which allow the circumferential shape of the liner to vary relative to the flange, characterised in that the inner circumferential edge of the or each flanged end of the bearing has a curved profile as viewed in cross-section through the bearing axis.

Preferably the curved profile is formed on both the ends of the liner and the inner edge of the flange.

In the case where the means for attaching the flange to the liner comprise inwardly projecting lugs around the inner periphery of the flange which engage in slots in the end of the liner, the curved profile may also be formed on the lugs.

DESCRIPTION OF THE PREFERRED EMBODIMENT

Figure 1:
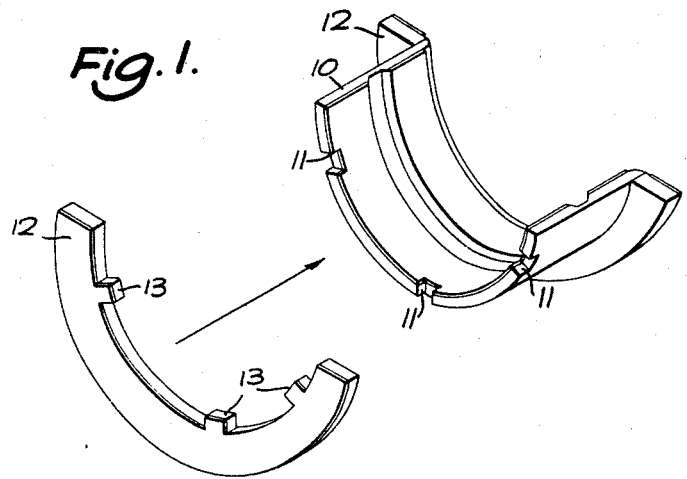
FIG. 1 is an exploded perspective view showing the assembly of a flanged half bearing.

Referring firstly to FIG. 1 of the drawings a half bearing liner 10 has three slots 11 through each of its circumferential edges. Thrust flanges 12 for mounting on the liner have inwardly extending lugs 13 for engaging in the slots in the liner.

Prior to attachment of the flanges to the liner both the inner edge of the flanges and the end edges of the liner are generally square.

Figure 2:
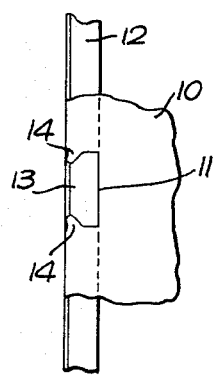
FIG. 2 is a first detailed view of the joint between a flange and the liner.

The flanges 12 are mounted on the circumferential ends of the liner and the lugs 13 locate in the slots 11. The outer corners of the slots are then indented as indicated in FIG. 2 to form stakes 14 to retain the flanges on the liner. The lugs are sufficiently loose in the slots to permit the liner to flex radially with respect to the flange and to permit the flanges limited axial movement with respect to the liner.

Figure 3:
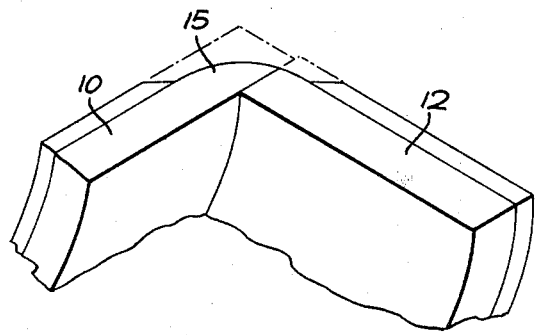
FIG. 3 is a second detailed view of the joint between a flange and the liner.

Two such bearings are then assembled to form a complete bearing and cutters are traversed simultaneously in opposite directions around both ends of the bearing to machine a curved profile 15 (see FIG. 3) on the inner edges of the liner, the inner edges of the flanges and the lugs 13. Although the machining operations remove part of the stakes 14, sufficient of the stakes is left to hold the flanges on the liner. The dotted outline in FIG. 3 indicates the profiles of the flange and a liner before machining. The corners of the bearing can then accommodate the radiused corners or fillet radii provided between a crankshaft journal and cheeks with which the bearing is assembled.

More specific details of the materials of the components of the bearing and their assembly are to be found in our U.S. Pat. No. 3,713,714.

The bearing liner may be produced by the method and apparatus described in our U.S. Pat. No. 3,513,520 in which case the inner circumferential edges of the liner already have a small chamfer and this is formed into a radius by the above operation.

I claim:

1. A flanged half bearing comprising a thin wall flexible half bearing liner and a flange extending radially outwardly of at least one end of the liner and attached to the liner by means which allow the circumferential shape of the liner to vary relative to the flange, characterised in that the inner circumferential edge of the flanged end of the bearing has a curved profile as viewed in cross-section through the bearing axis.

2. A flanged half bearing as claimed in claim 1 wherein the curved profile is formed on both the ends of the liner and the inner edge of the flange.

3. A flanged half bearing as claimed in claim 2 and where the means for attaching the flange to the liner comprise inwardly projecting lugs around the inner periphery of the flange which engage in slots in the end of the liner, wherein the curved profile is also formed on the lugs.

4. A flanged half bearing as claimed in claim 1 wherein the liner has said flanges at both ends thereof.

* * * * *